Sept. 5, 1961 W. S. EVERETT 2,998,860
SOUND SILENCING AND FILTERING APPARATUS
Filed Feb. 14, 1958

INVENTOR.
WILHELM S. EVERETT
BY *Elliott & Pastoriza*
ATTORNEYS

United States Patent Office 2,998,860
Patented Sept. 5, 1961

2,998,860
SOUND SILENCING AND FILTERING
APPARATUS
Wilhelm S. Everett, 1349 E. Main St., Santa Paula, Calif.
Filed Feb. 14, 1958, Ser. No. 715,445
9 Claims. (Cl. 181—54)

This invention generally relates to sound filtering and silencing apparatus, and more particularly concerns a device for attenuating, silencing, and filtering noises normally emanating from high velocity fluid flow through an exhaust or escape passage. The present invention is primarily designed to decrease the noise level to a decibel range below the hazard level in accordance with the environmental conditions of the particular application.

The present invention is equally adaptable to air, gas, and steam flow. For example, the unit may be applied to steam relief valves, steam vents, air vents, gas "blowdowns" and other diverse applications characterized by relatively high velocity escape of fluid to atmosphere or analogous low pressure areas.

Most conventional devices of this character presently available on the market employ a design in which the fluid flow passes through a muffler-like apparatus usually a single perforated tubular member with the inlet area thereto and the escape area therefrom being substantially the same. Although this type of silencing apparatus may be effective to eliminate certain upstream noises, e.g., valve chatter and the like, it has been found that the turbulent jet noise energy is not significantly reduced and the total noise level upon escape to atmosphere may be hazardous particularly in applications where relatively high velocity fluid flow is present.

It is, therefore, an object of the present invention to provide a silencing and filtering apparatus for application to fluid exhaust passages which embodies a design adapted to filter and attenuate to an appreciable extent turbulent jet noise as well as conventional upstream noises.

Another object of the present invention is to provide a silencing and filtering apparatus for application to the fluid exhaust passage which is constructed such that low pressure type materials and joints may be used despite relatively high velocity and high pressure fluid being silenced.

Another object of the present invention is to provide a filtering and silencing apparatus for application to a fluid exhaust passage which is not only inherently designed for effective sound attenuation but also is of such a construction that fluid abrasive action is minimized resulting in a substantially longer, maintenance-free life of the unit.

Another object of the present invention, in a preferred embodiment, is to provide means for not only reducing the sound power level but also for separating out any condensate which may be dispersed in the particular fluid being exhausted.

Another object of the present invention is to provide a filtering and silencing apparatus for application to a fluid exhaust passage, in which the apparatus is so constructed as to attenuate both high and low frequencies with a relatively wide band of effective attenuation.

Still another object of the present invention is to provide a silencing and filtering apparatus for application to a fluid exhaust passage which is susceptible of relatively economical manufacture with a minimum number of parts, and yet which is still characterized by a rugged and safe design.

These and other objects and advantages of the present invention are generally attained by providing a device for attenuating noises from fluid flowing through an exhaust or escape passage, and in which the device comprises elongated casing means provided with closure means sealing off one end thereof. Fluid inlet means extend through the closure means, and the fluid inlet means is designed to have a given area and to be adapted for fluid tight coupling to the exhaust passage being silenced.

First header means are disposed within the casing means a given distance from the other end thereof, and the first header means define an inner lateral wall extending across the casing. Second header means are positioned so as to close off the other end of the casing. A plurality of perforated tubes extend axially through the casing means between the first header means and the second header means. In order to provide a continuous passage for flow of fluid, means defining a plurality of first openings are provided in the first header means so as to communicate respectively with the inner ends of the tubes; and, similarly means defining a plurality of second openings are provided in the second header means so as to communicate, respectively, with the outer ends of the tubes.

As an important feature of the present invention, a dish-shaped reflector means, which may be formed integrally with the second header means, is coupled to and expands outwardly from the other end of the casing means.

With such a construction, fluid first passes through the inlet means, then expands to pass through the first header means and the tubular members, and thereafter expands further to pass through the second header means and the reflector means to be exhausted to atmosphere.

In a preferred form of the invention, the silencing and filtering apparatus further includes shielding means supported within the casing means to define an annular opening between the first header means and the inlet means. Thus, fluid after flowing through the inlet means is directed by the shielding means radially outward before continuing in an axial direction through the annular opening to subsequently pass through the first header means into the tubular members.

A better understanding of the present invention will be had by reference to the drawings, illustrating only one embodiment of the invention, and in which.

Figure 1:
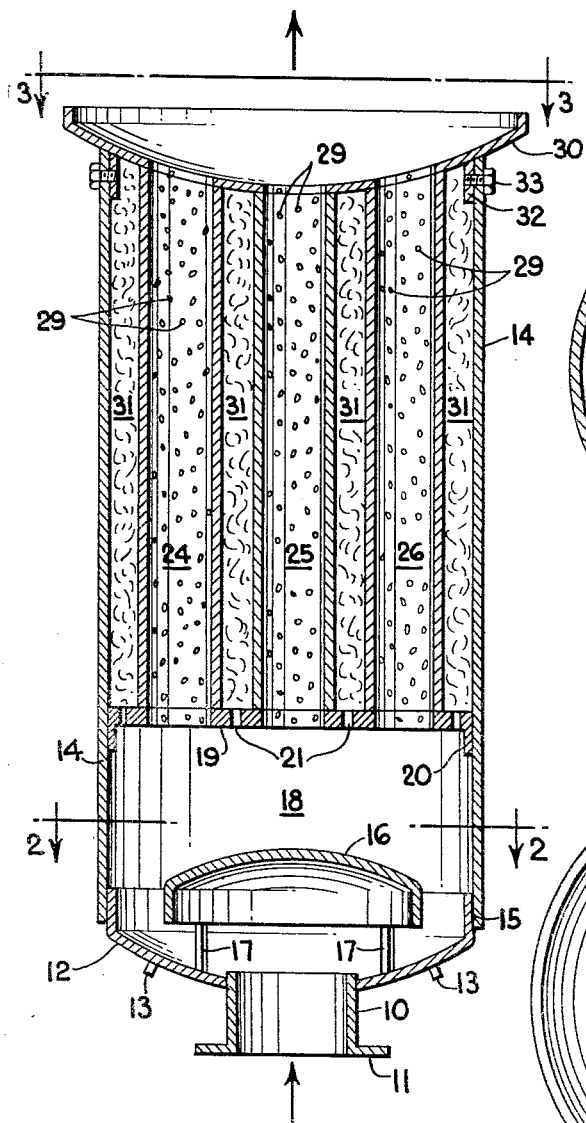
FIGURE 1 is a sectional view taken lengthwise through the silencing and filtering apparatus of the present invention.

Referring now to the drawings, there is shown in FIGURE 1 a preferred illustrative embodiment of the silencing and filtering apparatus according to the present invention. The apparatus includes inlet means in the form of a nozzle 10 provided with a flange 11 for coupling to the fluid exhaust passage to be silenced. The nozzle 10 extends through and is rigidly connected, as by welding, to a domed cap or end closure member 12 provided with drain cocks or valves 13. End closure 12 is in turn rigidly secured, for example, by welding to the main shell or casing 14 of the apparatus, as indicated at 15.

Figure 2:
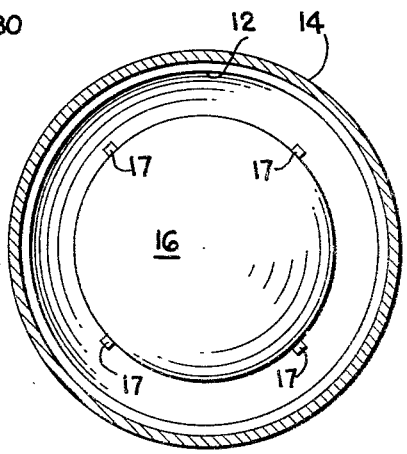
FIGURE 2 is a sectional view of the apparatus shown in FIGURE 1 taken in the direction of the arrows 2—2 thereof; and, FIGURE 3 is a top elevational view of the apparatus shown in FIGURE 1 taken in the direction of the arrows 3—3 thereof.

Immediately axially above the nozzle 10 is disposed a concave shielding member 16, which is axially supported by a plurality of legs 17 extending upwardly from the inner surface of the closure member 12. A clearer understanding of the construction of the shielding member 16 and its method of support may be more clearly seen by reference to FIGURE 2.

A first stage expansion chamber 18 is defined to a substantial extent by the shielding member 16, the casing 14, and first header means 19, preferably in the form of a flanged end plate as shown. In this regard, the header 19 may be provided with a downwardly extending flange 20, which has an outer diameter substantially equal to the inner diameter of the casing 14 so as to form an inner laterally extending wall within the unit. The header 19 is provided with a plurality of axially extending passages or "weep" holes 21 extending therethrough for a purpose which will become clearer as the specification proceeds.

Communicating with the header 19 through apertures provided therein are a plurality of tubes 22, 23, 24, 25, 26, 27, and 28. Tubular members 24 through 26 are shown in FIGURE 1 with all seven of the tubes being shown more clearly in the view of FIGURE 3. Each of the tubular members is perforated with apertures of given size and spacing according to the design requirements of the unit, as shall hereafter be explained. The tubular members communicate at their upper or outer ends with a second header means 30 similarly provided with openings to enable flow of fluid through the tubular members and head assembly.

Disposed between the first or lower header 19 and the upper header 30 in the space unoccupied by the tubular members 22 through 28 is a sound absorbing material 31 preferably of a fibrous nature such as Fiberglas. However, it will be appreciated that other types of sound absorbing material such as copper chips, steel chips, and the like may be employed to meet the requirements of this invention.

The upper header 30 is preferably dish-shaped or of a parabolic curvature so as to define a reflector means tending to channel noise waves directly upward as indicated by the arrow. In one form of construction, the header 30, tubular members 22 through 28, and lower header 19 are constructed as one rigid unit that may be lowered into the casing 14 and attached through means of flanges 32 with bolts 33 to the casing 14 as shown in FIGURE 1. It is, of course, conceivable to employ other types of constructions to arrive at the final design shown. However, with this type of construction the Fiberglas may be inserted as the tubular members are lowered down into the casing while being supported from the header 30. In addition, in the event the material 31 need be replaced or the unit cleaned or otherwise maintained, it is merely necessary to uncouple the bolts 33 and hoist the header 30 out of the casing 14 with the tubular members connected thereto.

The operation and inherent advantages of the design employed with the filtering and silencing apparatus of the present invention may now be described in greater detail in conjunction with the foregoing description. As mentioned heretofor, the unit is primarily designed for application to high velocity fluid flow or exhaust escape passages and has the primary purpose of lowering the sound power level to a decibel range not hazardous to human beings in the immediate area. For example, a conventional steam jet or the like may normally have a sound lower level of 160 decibels. With the apparatus of the present invention coupled to the exhaust passage, the sound power level may be decreased appreciably to approximately 90 decibels or even lower.

In bringing about this result, when the inlet means 10 or nozzle is coupled to the fluid outlet passage, the gas, air, or steam will first pass through the nozzle and thereafter impinge against the shielding means 16. In consequence, the fluid will be directed radially outwardly through the annular opening defined between the shielding means 16 and the inner diameter of the casing 14 to pass axially upwardly expanding into the first stage chamber 18. It will be appreciated that in the event the fluid contains any dispersed particles of condensate or other foreign matter, shielding means 16 will serve to direct such matter downwardly to channel outwardly through the unit as through the valves 13. The shielding means 16 will additionally function to distribute the fluid throughout the entire cross sectional area of the casing 14 before the fluid axially reaches the first header means 19. Of course, with the expansion of the fluid in chamber 18 certain jet noises will develop in addition to whatever upstream noises were carried with the fluid when it entered the unit through the nozzle 10.

Upon reaching the header means 19, the fluid will be directed through the tubular members 22 through 28 to pass upwardly therethrough. The tubular members and the perforated sidewalls thereof serve several important functions in attenuation and filtering of the various frequency ranges.

It is to be first noted that a plurality of tubes are employed to considerably shorten the overall length of the unit. Thus, since the attenuation in any given tubular or pipe member is a function of its diameter ratio or the length of the tube with respect to its diameter, considerably more attenuation may be achieved by employing a plurality of tubes in a given lngth of the unit rather than a single tube. Preferably, the diameter ratio of the tubes employed is in the range of 4 to 1, to 6 to 1, whereby assuming an attenuation of approximately 5 to 6 decibels per diameter ratio, approximately 30 decibels of attenuation are achieved throughout the average length of the tubes employed.

By perforating the tubes, a reactive tube lining is attained which will function as a plurality of minute "Helmotz" resonators. The higher frequency noises will, of course, be attenuated by the fibrous or sound absorbent material preferably Fiberglas as heretofore mentioned, as well as by the tube length. The size of the holes or apertures in the tubes as well as the spacing chosen will be dependent upon the particular frequency ranges to be attenuated. Thus, the areas of the apertures and their spacing will be chosen so that the impendance of the aperture is substantially equal to the reactance of the Fiberglas occupied volume between the tubes within the casing 14. It has been found that Fiberglas is very effective to broaden the band of effective attenuation.

It will be appreciated that by having the first stage of expansion in the chamber 18 of relatively high magnitude, an appreciable proportion of the jet noises are attenuated through the tubes 22 through 28 before the secondary expansion of the fluid occurs upon exhaustion through the second header means or reflector means 30 to atmosphere. The second header means 30 not only serves as a means of secondary expansion of the fluid, but serves the primary function of directing the noise level substantially upward in view of the parabolic shape employed. Of course, for this purpose the reflector means desirably has a diameter in the order of magnitude of the wave length of the dominant jet noise of the fluid escaping.

Figure 3:
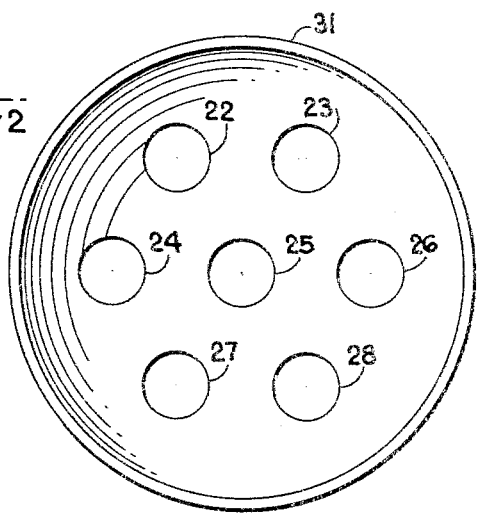

An important feature of the present invention resides in the fact that the design of the unit is such that the "escape" area is at least twice if not three to seven times the cross section of the inlet area to the unit. In view of the fact that the fluid jet normally diverges at approximately an angle of 14°, it has been approximated that the total escape area of the fluid at the point where is leaves the uppermost or terminal portion of the unit will be equal to approximately the total area defined by the pitch circle of the outer tubes 22, 23, 26, 28, 27, and 24 as shown in FIGURE 3 plus the six half-tubular areas of these tubes. Thus, in one workable embodiment, assuming the total cross sectional area of the tubes to be approximately twice as large as the inlet area of the nozzle 10, a total escape area may be in the range of approximately four times the inlet area.

The advantages in using an escape area in this ratio are evident in that the escape noise energy, assuming a relatively constant energy factor, will vary to the eighth power of the escape velocity in the area of the passage through which the fluid flows. Thus, the escape noise energy is considerably lowered by using an escape area several times larger than the inlet area. In addition, the increased area represented by the tubes 22 through 28 enables construction of a non-pressure type vessel or casing 14 and decreases the possibility of abrasive action which would normally be present in a higher velocity flow fluid.

It will, therefore, be evident that the design and construction of the sound silencing and filtering apparatus of the present invention not only enables effective attenuation of jet noises below the hazardous level to human beings, but also results in construction particularly advantageous to longer life of the unit as well as economical production. It will be appreciated that many changes and modifications may be made which will depart from the illustrative embodiment shown although still falling within the scope and spirit of the invention as set forth in the appended claims.

What is claimed is:

1. A device for attenuating noises from fluid flowing through an exhaust passage, said device comprising: an elongated casing having a closure at a first end; an inlet pipe extending through said closure; a first header within said casing proximate said closure; a second header at a second end of said casing; a plurality of perforated pipes each extending through both of said headers; and, sound absorbent material in said casing between said headers and surrounding said pipes, said second header comprising an outwardly concave dish-shaped reflector for directing any noise issuing from said device in a single direction.

2. A device for attenuating noises from fluid flowing through an exhaust passage, according to claim 1, in which the total given cross sectional area of said perforated pipes is greater than the cross sectional area of said inlet pipe.

3. A device for attenuating noises from fluid flowing through an exhaust passage, according to claim 1, in which each of said perforated pipes has a length to diameter ratio between the limits of 4 to 1 and 6 to 1, whereby substantial noise attenuation is achieved by flow of said fluid therethrough.

4. A device for attenuating noises from fluid flowing through an exhaust passage, according to claim 1, in which said reflector has a diameter in the order of magnitude of the dominant wave length of the jet noise of the fluid escaping.

5. A device for attenuating noises from fluid flowing through an exhaust passage, according to claim 1, and a shielding member centrally supported within said casing to define an annular opening axially disposed between said first header and said inlet pipe, whereby said fluid after impinging against said shielding member flows radially outwardly and thereafter axially through said annular opening before being distributed for passage through said first header into said perforated pipes.

6. A device for attenuating noises from fluid flowing through an exhaust passage, said device comprising: a cylindrical casing having a closure at a first end; an inlet pipe extending through said closure; a first header within said casing proximate said closure; a second header at a second end of said casing; a plurality of perforated pipes each extending through both of said headers; a concave shielding member centrally positioned and supported within said casing, said shielding member being axially disposed between said first header and said inlet pipe to define an annular opening with the inner sidewalls of said casing; sound absorbent material in said casing between said headers and surrounding said perforated pipes, said second header comprising an outwardly concave dish-shaped reflector for directing any noise issuing from said device in a single direction.

7. A device for attenuating noises from fluid flowing through an exhaust passage, according to claim 6, in which said reflector of said second header is parabolic in shape and has an inside diameter in the order of magnitude of the dominant wave length of the jet noise of the fluid escaping.

8. A device for attenuating noises from fluid flowing through an exhaust passage, according to claim 6, in which said first header, said perforated pipes, and said second header comprise an integral unit inserted within said casing; and, means securing said unit within said casing.

9. A device for attenuating noises from fluid flowing through an exhaust passage, according to claim 6, in which the fluid escape area from said reflector of said second header is in the range of two to seven times the area of said inlet pipe.

References Cited in the file of this patent

UNITED STATES PATENTS

| | | |
|---|---|---|
| 1,366,632 | Carlen | Jan. 25, 1921 |
| 1,595,711 | Cornelier | Aug. 10, 1926 |
| 1,909,511 | Wilson | May 16, 1933 |
| 2,325,905 | Caulfield | Aug. 3, 1943 |
| 2,389,988 | Leadbetter | Nov. 27, 1945 |
| 2,609,886 | Harmon | Sept. 9, 1952 |

FOREIGN PATENTS

| | | |
|---|---|---|
| 736,944 | Germany | July 2, 1943 |